US008537905B2

(12) United States Patent
Khoury

(10) Patent No.: US 8,537,905 B2
(45) Date of Patent: Sep. 17, 2013

(54) METHOD AND SYSTEM FOR ADJUSTING INTERCONNECT VOLTAGE LEVELS IN LOW POWER HIGH-SPEED DIFFERENTIAL INTERFACES

(75) Inventor: Elie Khoury, Gilbert, AZ (US)

(73) Assignee: NXP B.V., Eindhoven (NL)

( * ) Notice: Subject to any disclaimer, the term of this patent is extended or adjusted under 35 U.S.C. 154(b) by 1374 days.

(21) Appl. No.: 12/282,203

(22) PCT Filed: Mar. 9, 2007

(86) PCT No.: PCT/IB2007/050782
§ 371 (c)(1),
(2), (4) Date: Sep. 9, 2008

(87) PCT Pub. No.: WO2007/102135
PCT Pub. Date: Sep. 13, 2007

(65) Prior Publication Data
US 2009/0075607 A1 Mar. 19, 2009

Related U.S. Application Data

(60) Provisional application No. 60/781,124, filed on Mar. 9, 2006.

(51) Int. Cl.
*H04L 27/00* (2006.01)
(52) U.S. Cl.
USPC ..... 375/259; 375/257; 455/127.1; 455/169.1; 307/412; 307/130
(58) Field of Classification Search
USPC ................... 375/257, 259; 455/127.1, 169.1; 307/412, 130; 370/284
See application file for complete search history.

(56) References Cited

U.S. PATENT DOCUMENTS 5,959,492 A * 9/1999 Khoury et al. ............... 327/389
5,999,044 A 12/1999 Wohlfarth et al.
(Continued)

FOREIGN PATENT DOCUMENTS

DE 20023492 U1 7/2004
EP 0942562 A2 9/1999

OTHER PUBLICATIONS

Pravas Pradhan and Jeff Ju, Fairchild Semiconductor, "Low-Power Differential Interface Technologies for Portable Products", EDN Europe, http://www.edn.com/contents/images/515309.pdf; Apr. 2005.

(Continued)

*Primary Examiner* — Shuwang Liu
*Assistant Examiner* — Sung Ahn

(57) ABSTRACT

The present invention relates to adjustment of interconnect power levels in high-speed differential serial links. In an example embodiment, a digital signal received at a digital input port is converted in a driver into a corresponding differential signal and provided to output ports connected to a differential transmission line for provision to a receiver. For adjusting the interconnect power levels between the driver and the receiver a voltage regulator is interposed between a voltage source and the driver. The voltage regulator provides regulated supply voltage to the driver. In operation, the voltage regulator receives from control circuitry a control signal indicative of a predetermined regulated voltage for provision to the driver for a pre-selected type of data transmission. In dependence upon the received control signal the voltage regulator selects the corresponding reference voltage and provides it to the driver. The adjustment of interconnect power levels is highly beneficial by enabling a substantial reduction of power consumption.

15 Claims, 7 Drawing Sheets

(56) References Cited

U.S. PATENT DOCUMENTS

| | | | |
|---|---|---|---|
| 6,025,742 A * | 2/2000 | Chan | 327/108 |
| 6,094,735 A * | 7/2000 | Cole et al. | 714/724 |
| 6,566,933 B1 | 5/2003 | Lye | |
| 6,639,434 B1 | 10/2003 | Rahman | |
| 6,842,037 B1 * | 1/2005 | Gradl | 326/30 |
| 6,943,588 B1 * | 9/2005 | Luo et al. | 326/86 |
| 6,956,920 B1 * | 10/2005 | Veenstra et al. | 375/372 |
| 7,009,827 B1 * | 3/2006 | Lee et al. | 361/91.1 |
| 7,176,724 B1 * | 2/2007 | Delson | 326/83 |
| 7,218,146 B2 * | 5/2007 | Shibata et al. | 326/82 |
| 7,230,449 B2 * | 6/2007 | Dreps et al. | 326/30 |
| 7,250,793 B2 * | 7/2007 | Lu | 327/108 |
| 7,408,995 B2 * | 8/2008 | Segaram | 375/257 |
| 7,501,859 B1 * | 3/2009 | Ohannes | 326/82 |
| 2003/0210074 A1 | 11/2003 | Morgan et al. | |
| 2004/0125753 A1 * | 7/2004 | Mahany et al. | 370/254 |
| 2006/0217079 A1 * | 9/2006 | Yu et al. | 455/78 |

OTHER PUBLICATIONS

JEDEC standard—"Scalable Low-Voltage Signaling for 400 mV (SLVS-400)", JESD8-13, Oct. 2001.

\* cited by examiner

METHOD AND SYSTEM FOR ADJUSTING INTERCONNECT VOLTAGE LEVELS IN LOW POWER HIGH-SPEED DIFFERENTIAL INTERFACES

This invention relates generally to low power high-speed differential serial links, and in particular to a method and system for adjusting interconnect power levels in low power high-speed differential serial links.

In many low power devices such Cell Phones, PDAs, etc. parallel buses are more and more replaced by high-speed differential serial links for providing communication between various components, for example, different chips; a chip and a display; a base-band and an RF-module; a camera and a processor.

In high-speed differential serial links differential drivers are used for the generation of differential signals that are transmitted on pairs of conductors. The differential signals are referenced to each other rather than a ground potential. One of the differential signals in each differential signal pair is labeled "positive" or "true" while the other is labeled "negative" or "false". A major advantage of high-speed differential serial links is a substantially lower power consumption and smaller size.

Using current CMOS technologies, high-speed differential serial links dissipate substantially less power than parallel buses. For example, a 400 mV differential voltage across a 100Ω transmission line requires a constant current of 4 mA. Therefore, using a voltage mode driver with a voltage supply of 1.2V the static or constant power dissipation is 4.8 mW, and using a current mode driver the constant power dissipation is approximately double, i.e. 9.6 mW. This power consumption of a few mW is considerably less than the power consumption of parallel buses, making high-speed differential serial links the preferred choice for data transmission in compact portable devices. However, while the power dissipated in high-speed differential serial links is low compared to parallel buses, it is still a major factor limiting integration and miniaturization of future generations of low power devices.

Therefore, it would be highly desirable to provide means for reducing power consumption in high-speed differential serial links.

It is, therefore, an object of the invention to provide a method and system for reducing power consumption in high-speed differential serial links by adjusting interconnect power levels.

In accordance with the present invention there is provided a method for adjusting interconnect power levels. A voltage regulating device in communication with a voltage supply port of a driver of a high-speed differential serial link is provided. The voltage regulating device receives at a control port a control signal indicative of a predetermined regulated voltage for provision to the driver for a pre-selected type of data transmission to a receiver via the high-speed differential serial link. The pre-selected type of data transmission has a corresponding interconnect power level. The voltage regulating device then provides the regulated supply voltage to the driver for transmission of a data signal according to the pre-selected type of data transmission to the receiver.

In accordance with another aspect of the invention there is provided a system for adjusting interconnect power levels that comprises a driver, a voltage regulating device, and control circuitry. The driver has a digital input port for receiving a digital data signal and differential output ports for being connected to a differential transmission line of a high-speed differential serial link. The driver converts the digital data signal into a differential signal for transmission via the differential transmission line to a receiver. The voltage regulating device is connected to a voltage supply port of the driver and comprises a control port for receiving a control signal. The voltage regulating device provides a regulated supply voltage to the driver in dependence upon the control signal. The control circuitry is in communication with the control port of the voltage regulating device and generates the control signal in dependence upon a pre-selected type of data transmission having a corresponding interconnect power level. The control signal is indicative of the regulated supply voltage with the regulated supply voltage being such that the differential signal has the corresponding interconnect power level.

Exemplary embodiments of the invention will now be described in conjunction with the following drawings, in which.

Figure 1:
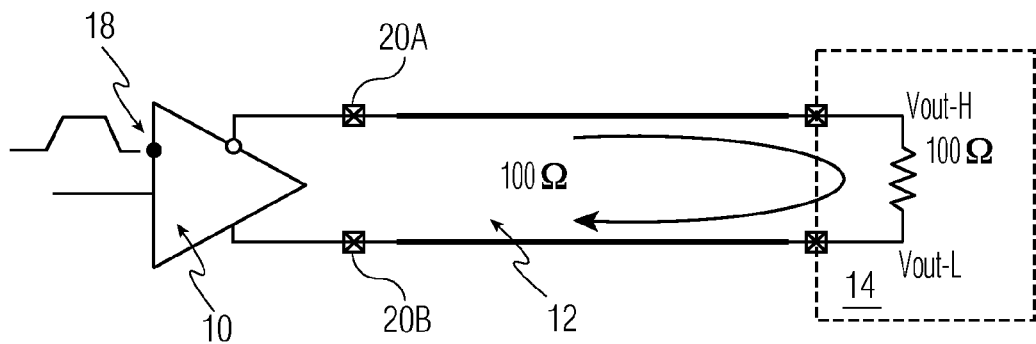
FIG. 1 is a simplified block diagram illustrating a SLVS driver and a receiver load.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

In the following, a preferred embodiment of the invention will be described in an implementation with a differential Scalable Low Voltage Signaling (SLVS) voltage driver. As will become evident to those of skill in the art, the invention is not limited to SLVS voltage drivers but also applicable to other voltage mode drivers as well as current mode drivers of high-speed differential serial links. In order to provide a better understanding, a state of the art example of a high-speed differential serial link—SLVS—will be shown, with reference to FIGS. 1 to 3. Of course, it is possible to derive the power consumption and options for reducing the same, as shown in the following example, in similar fashion for other applications.

Referring to FIG. 1, an example of a high-speed differential serial link employing a SLVS voltage driver with fixed output impedance is shown. A high-speed differential voltage driver 10 is connected to a receiver termination 14 via a differential transmission line 12. It is noted that the transmission line 12 has no bearing on the static power dissipation and is used here for illustration only.

Figure 2:
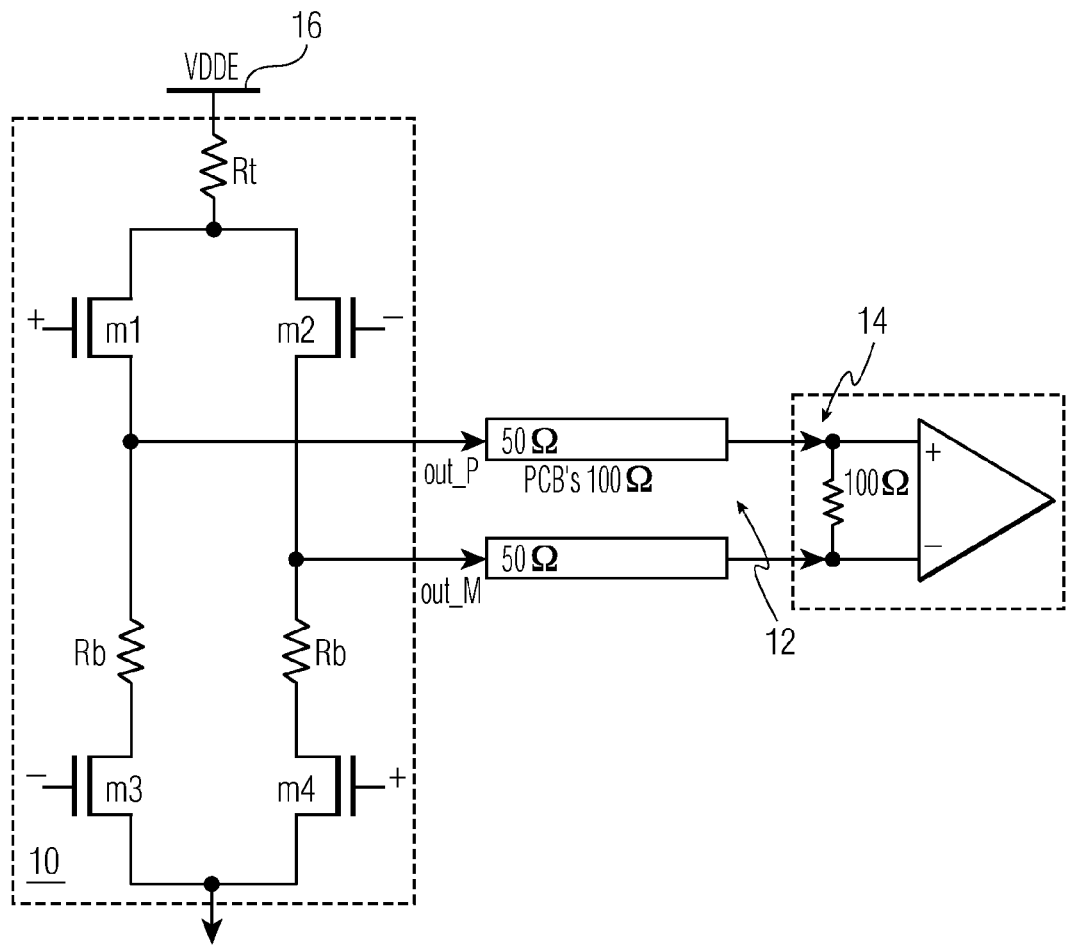
FIG. 2 is a simplified block diagram illustrating the SLVS driver shown in FIG. 1 in more detail.

FIG. 2 shows a more detailed diagram of a Digital-To-Analog (D2A) driver of the SLVS link shown in FIG. 1. The D2A driver 10 is of a push-pull type with all NMOS switches—m1 to m4. The top NMOS switches—m1 and m2—are of follower type, i.e. the source—output—voltage follows the gate voltage, and the bottom switches—m3 and m4—are normal operating devices.

Figure 3:
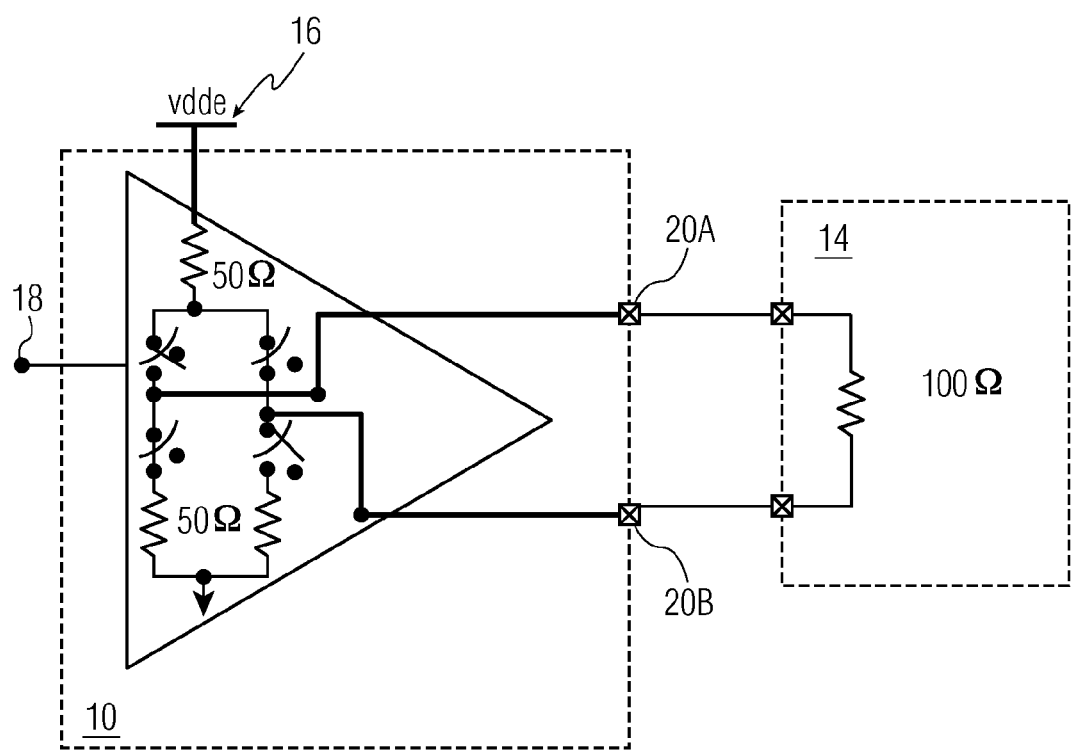
FIG. 3 is a simplified block diagram illustrating the SLVS driver shown in FIG. 2 with the NMOS switches being by ideal switches for illustrating power consumption of the SLVS driver.

FIG. 3 illustrates a simplified equivalent driver representation showing ideal switches in place of the NMOS switches and with resistors Rb=Rt=50Ω. In an ideal case, the pull up and the pull down structure each have 50Ω impedance. The total impedance RT from voltage source Vdde 16 to ground is then the summation of the pull-up impedance, the receiver impedance, and the pull-down impedance, i.e. RT=50Ω+100Ω+50Ω=200Ω. Since the driver 10 is a differential driver, a continuous current flows from the voltage source Vdde 16 into the resistor of the receiver termination 14 and then to ground, regardless of the path, i.e. which pull-up and pull-down switches are ON. The static power dissipation is then determined as follows:

$$I(vdde)=vdde/RT,$$

with I(vdde) being the current to ground for a given supply voltage vdde from the voltage source Vdde 16;

$$v(out)=100\Omega*I(vdde),$$

with v(out) being the output voltage of the driver 10 and the receiver impedance being 100Ω; and, $$P(vdde)=vdde*I(vdde)=vdde^2/RT,$$

with P(vdde) being the dissipated power for the given supply voltage vdde.

For example, for a supply voltage vdde=0.8 V follows:

$$I(vdde)=4\text{ mA};$$

$$v(out)=400\text{ mV; and,}$$

$$P(vdde)=3.2\text{ mW}.$$

Using the above equations for supply voltages vdde=0.4V and 0.2 V, we obtain:

$$I(vdde)=2\text{ mA and 1 mA};$$

$$v(out)=200\text{ mV and 100 mV; and,}$$

$$P(vdde)=0.8\text{ mW and 0.2 mW, respectively}.$$

From the above equations follows, for example, that a reduction of the supply voltage vdde by a factor of 4 reduces the output voltage of the driver 10 by a factor of 4, while the dissipated power is reduced by a factor of 16. Therefore, a reduction of the output voltage by reducing the supply voltage vdde results in a substantial reduction of the dissipated power, i.e. power consumption.

Figure 4A:
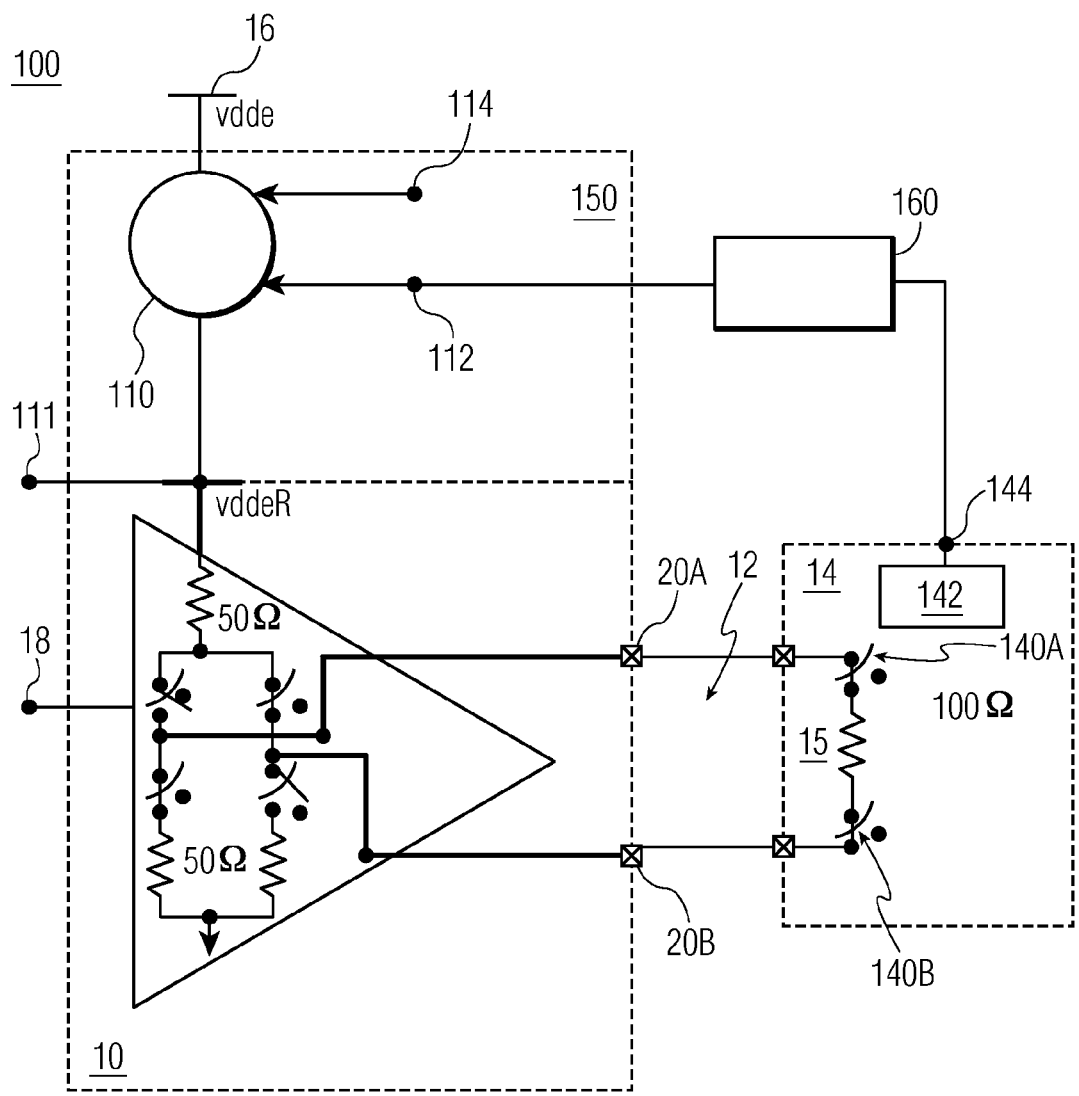
FIG. 4a is a simplified block diagram of a preferred embodiment of a system for adjusting interconnect power levels according to the invention.
Figure 4B:
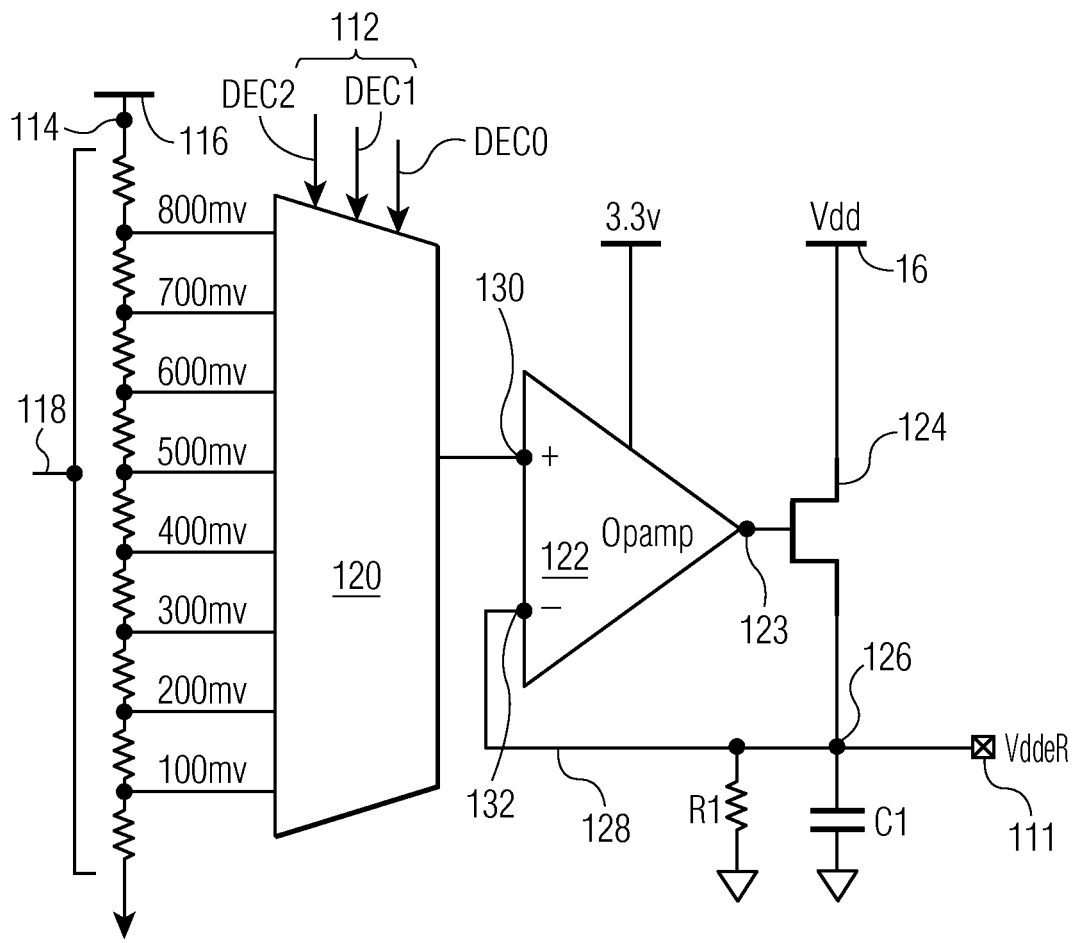
FIG. 4b is a simplified block diagram of a preferred embodiment of a voltage regulating device for use in the system shown in FIG. 4a; and, FIGS. 5a to 5c are simplified flow diagrams of three embodiments of a method for adjusting interconnect power levels according to the invention.

Referring to FIGS. 4a and 4b, a preferred embodiment of a system 100 for adjusting interconnect power levels according to the invention is shown. In the system 100 use is made of the fact that it is possible to supply a voltage mode driver—as well as a current mode driver—with a lower supply voltage while maintaining its characteristic impedance. The system includes the basic components as the system shown in FIGS. 1 to 3. For the sake of clarity, same reference numerals are used for same components. A digital signal received at digital input port 18 is converted in driver 10 into a corresponding differential signal and provided to output ports 20A and 20B connected to differential transmission line 12 for provision to receiver 14. For adjusting the interconnect power levels between the driver 10 and the receiver 14 a voltage regulator 110 is interposed between the voltage source 16 and the driver 10. The voltage regulator 110 provides, via port 111, a regulated supply voltage vddeR to the driver 10 in dependence upon a control signal received from control circuitry 160. Optionally, the control circuitry 160 is connected via receiver control port 144 to receiver control circuitry 142 of the receiver 14. This allows, for example, controlling a receiver termination 15 and providing receiver feedback, as will be described below.

FIG. 4b shows an example embodiment of a voltage regulator 110 for use with the system 100 shown in FIG. 4a. A resistor ladder—or resistor divider—118 connected via reference supply port 114 to a reference supply 116 and connected at an opposite end to ground provides multiple reference voltage steps to Analog Multiplexer 120. For example, the reference supply 116 is a core voltage of the device or a bandgap reference. The Analog Multiplexer 120 selects a reference voltage in dependence upon a decoder control signal received from the control circuitry 160 at control port 112 and provides it to a direct input port 130 of amplifier 122 such as a high gain op-amp. Output port 123 of the amplifier 122 is connected to a gate of NMOS Follower 124 interposed between voltage source 16 and node 126 connected to the regulated supply voltage port 111. Feedback loop 128 interposed between the node 126 and inverse input port 132 of the amplifier 122 ensures that the regulated output voltage is substantially the same as the selected reference voltage. High impedance RI to ground is used to provide a trickle current for maintaining the feedback loop 128. Optionally, the regulated output voltage is decoupled by means of capacitor C1. Of course, the number of reference voltage steps is easily modified depending on the application.

Alternatively, other types of voltage regulating devices are implemented in the system 100. For example, a high-speed "switcher" allows reducing the total power consumption approximately to the power dissipated in the driver 10.

The addition of the voltage regulator 110—or the switcher—does not impact the driver or receiver design. The voltage regulator 110 or the switcher is, preferably, implemented on a same chip 150 with the driver 10. Alternatively, the voltage regulator 110- or the switcher—is employed as an external component.

Optionally, the receiver 14 comprises switches 140A and 140B for switching resistor 15 IN for high-speed operation, and OUT for enabling reflective wave transmission during low-speed operation. In many cases it is possible to use a high-speed link in a low-speed mode. Using reflective wave transmission—i.e. un-terminated receiver—in such cases, only dynamic power is consumed while the static power consumption is reduced to zero. In this mode only a 100 mV supply is needed to transmit a 100 mV differential signal, further reducing the dynamic power consumption.

Knowing system requirements of a high-speed differential serial link and interconnect power level requirements it is possible to design the system 100 for controlling interconnect power levels by executing commands based on the above description and commonly available design parameters for various components stored on a storage medium.

Table 1 shows the reduction of the power consumption as the regulated voltage is reduced—compared to a case without voltage regulation.

TABLE 1

| VR | impedance | vdde | vddeR | Vout | Static current | Static vddeR power | Static vdde power |
| --- | --- | --- | --- | --- | --- | --- | --- |
| No  | 100 | 0.8 v | NA    | 0.4 v | 4 mA | NA     | 3.2 mW |
| Yes | 100 | 1.2 v | 0.4 v | 0.2 v | 2 mA | 0.8 mW | 2.4 mW |
| Yes | 100 | 1.2 v | 0.2 v | 0.1 v | 1 mA | 0.2 mW | 1.2 mW |
| Yes | 100 | 0.8 v | 0.4 v | 0.2 v | 2 mA | 0.8 mW | 1.6 mW |

TABLE 1-continued

| VR | impedance | vdde | vddeR | Vout | Static current | Static vddeR power | Static vdde power |
|----|-----------|------|-------|------|----------------|--------------------|--------------------|
| Yes | 100 | 0.8 v | 0.2 v | 0.1 v | 1 mA | 0.2 mW | 0.8 mW |
| NA | NA | 0.8 v | 0.8/0.4 | 0.8/0.4 | 0 mA | 0 mW | 0 mW |

It is noted that the power consumption P(vddeR) represents the power consumption in the driver 10, while the power consumption P(vdde) represents the total power consumption using a linear voltage regulator. The last row of table 1 represents the case of low-speed operation using an un-terminated receiver, with the static power consumption being reduced to zero.

The system 100 allows a single differential line driver 10 and receiver 14 to be utilized in different applications with different interconnect power requirements and signal to noise S/N ratios by enabling, for example, provision of higher interconnect power levels for noisy or high-speed environments, and provision of lower interconnect power levels for quite or lower speed environments. In portable devices such as cell phones RF radiation interferes with device to device communication. The S/N ratio is more prominent in low swing high-speed serial links. The S/N ratio has been measured, modeled, and simulated for numerous applications and is, therefore, well understood. This allows to preset an interconnect power level of a given differential serial link to overcome the S/N ratio or interference. Alternatively, a Bit Error Rate (BER) of the differential link is determined while the interconnect power level is adjusted during high and low noise activities, allowing to preset the interconnect power level to one level or multiple levels depending on the noise level. In other applications, such as PDAs, RF interference is not present. However, there are numerous other sources causing noise or interferences. In any case, using a high-speed differential serial link with an adjustable interconnect power level is highly beneficial by enabling a substantial reduction of power consumption resulting in an increase of battery life and/or employment of smaller batteries, and by allowing use of a same link for different transmission having different interconnect power level requirements. Furthermore, since the system 100 is operable over a wide range of interconnect power levels—or differential voltages—over a wide frequency range it enables use of a same system in numerous applications substantially simplifying the design process. Yet further, designers of new mega chips are enabled to choose a preferred voltage for each digital core and use the voltage regulator 110—or the switcher—of the system 100 to adapt the same to the chosen core voltage.

Figure 5A:
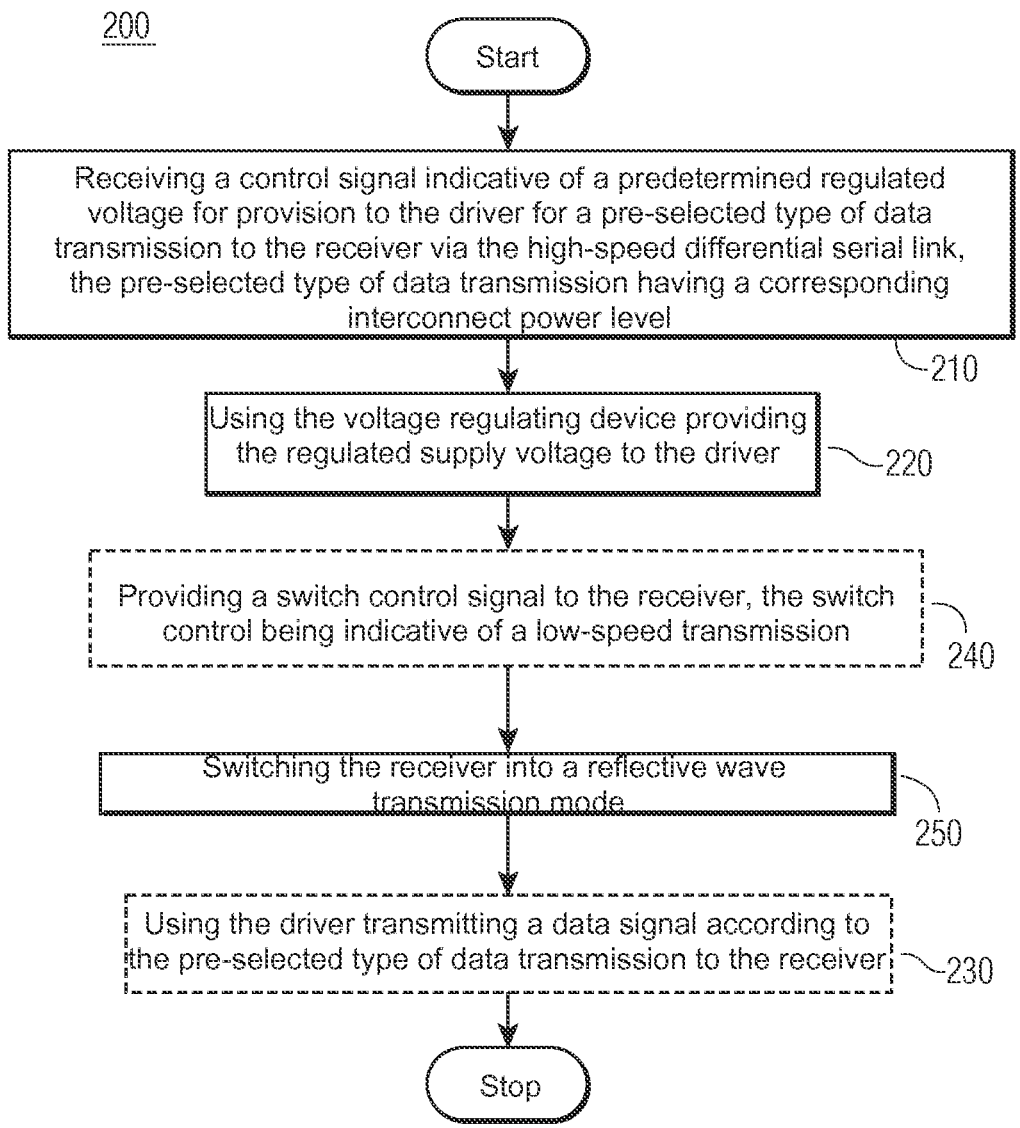

Referring to FIG. 5a, a first embodiment 200 of a method for controlling interconnect power levels according to the invention is shown. In a first step—box 210, the voltage regulator 110 receives from the control circuitry 160 at the control port 112 a control signal indicative of a predetermined regulated voltage for provision to the driver 10 for a following pre-selected type of data transmission. In dependence upon the received control signal the voltage regulator selects the corresponding reference voltage and provides it to the driver 10—box 220. Using the driver 10, the data signal is then transmitted to the receiver according to the pre-selected type of data transmission—box 230. The regulated voltage is determined by the control circuitry 160 in dependence upon the required interconnect power level of the pre-selected type of data transmission. For example, the control circuitry 160 selects a preset regulated voltage that corresponds to the type of data transmission. The control signal is provided to the voltage regulator 110 prior provision of a data signal to the driver 10 for transmission to the receiver 14. Optionally—indicated by dashed lines, the control circuitry 160 provides a control signal indicative of a high-speed or a low-speed data transmission to the receiver 14—box 240. Upon receipt of the control signal the switches 140A and 140B are switched IN in case of a type of high-speed transmission, or OUT in case of a type of low-speed transmission—box 250.

Figure 5B:
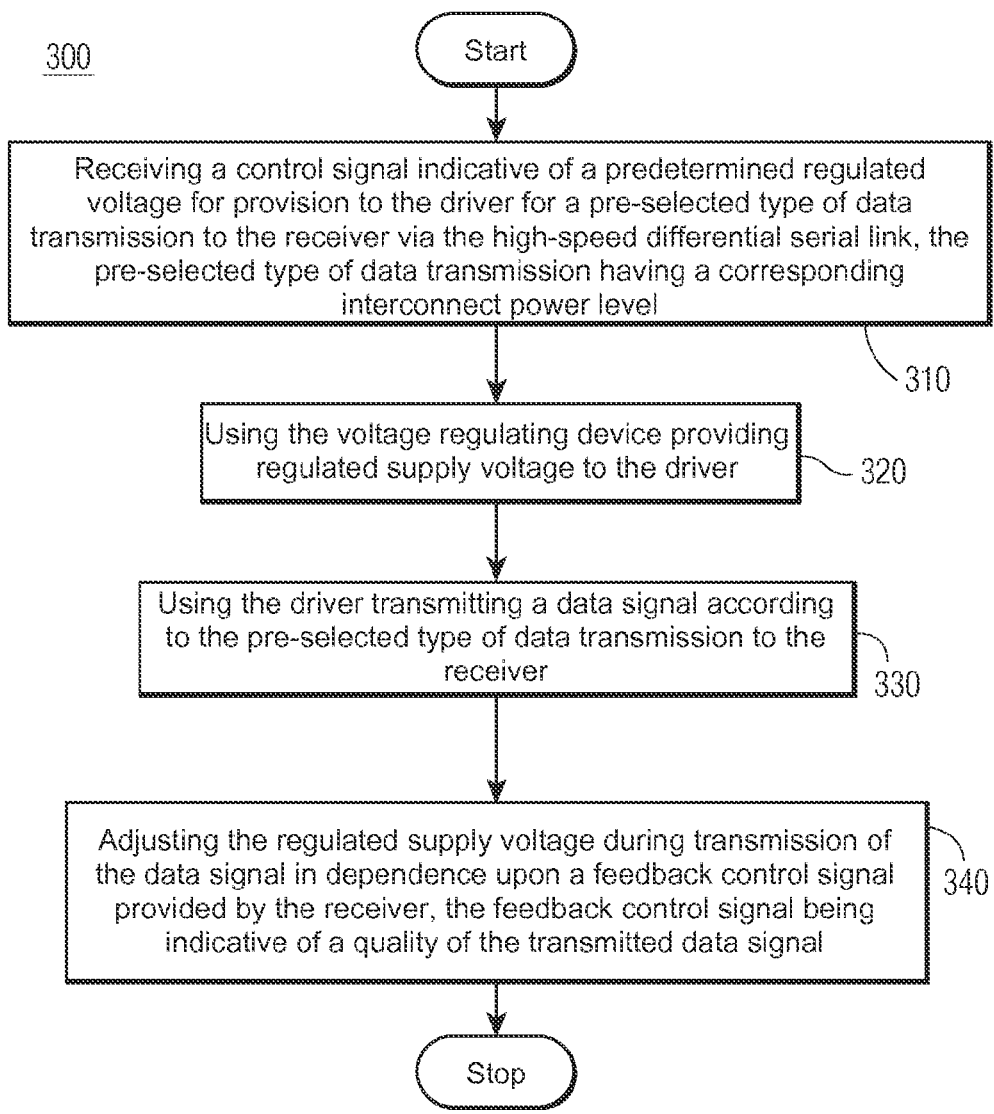

Referring to FIG. 5b, a second embodiment 300 of a method for controlling interconnect power levels according to the invention is shown. Referring to box 310, the voltage regulator 110 receives from the control circuitry 160 at the control port 112 also a control signal indicative of a predetermined regulated voltage for provision to the driver 10 for a following pre-selected type of data transmission. In dependence upon the received control signal the voltage regulator selects the corresponding reference voltage and provides it to the driver 10—box 320. Using the driver 10, the data signal is then transmitted to the receiver according to the pre-selected type of data transmission—box 330. During transmission of the data signal the regulated supply voltage is adjusted in dependence upon a feedback signal provided by the receiver—box 340. The feedback signal is indicative of a quality of the transmitted data signal. For example, if the feedback control signal is indicative of a "noisy" signal the control circuitry 160 determines an increased regulated voltage and provides a corresponding control signal to the voltage regulator 110. For example, this process is repeated until the feedback control signal is indicative of a satisfying signal quality. This is achieved, for example, by determining an S/N ratio or a BER. Optionally, the control circuitry 160 determines a decreased regulated voltage and provides a corresponding control signal to the voltage regulator 110 until the feedback control signal is indicative of a "noisy" signal. This process is performed, for example, in preset intervals and is advantageous by reducing power consumption during data transmission of long duration. Of course, the regulated voltages are adjusted such that the interconnect power level is high enough to prevent data corruption during transmission.

Figure 5C:
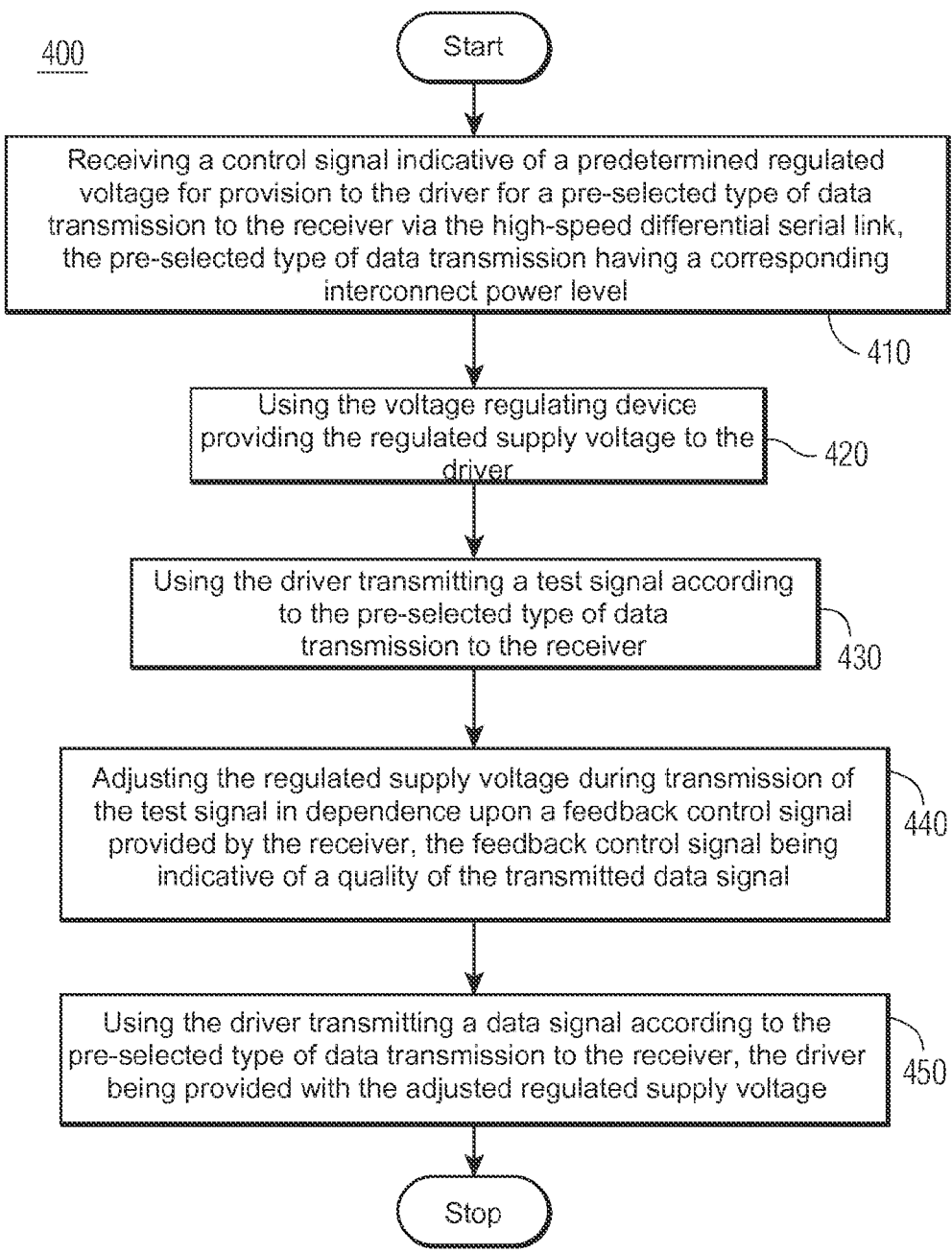

Referring to FIG. 5c, a third embodiment 400 of a method for controlling interconnect power levels according to the invention is shown. Referring to box 410, the voltage regulator 110 receives from the control circuitry 160 at the control port 112 a control signal indicative of a predetermined regulated voltage for provision to the driver 10 for a following pre-selected type of data transmission. In dependence upon the received control signal the voltage regulator selects the corresponding reference voltage and provides it to the driver 10—box 420. Using the driver 10, a suitable test signal is then transmitted to the receiver according to the pre-selected type of data transmission—box 430. During transmission of the test signal the regulated supply voltage is adjusted in dependence upon a feedback signal provided by the receiver—box 440. The feedback signal is indicative of a quality of the transmitted test signal. Upon completion of the adjustment, the data signal is then transmitted to the receiver 14 using the driver 10 with the adjusted regulated supply voltage—box 450. Optionally, data indicative of the adjusted regulated voltage is stored in memory for use as a pre-set regulated voltage for the pre-selected type of data transmission.

The implementation of the system 100 for controlling interconnect power levels has been illustrated using a preferred embodiment, but as is evident, is not limited thereto. There are various possibilities for implementing the voltage regulation based on control signals determined using one of the above methods, modifications, or combinations thereof, to accommodate different requirements of numerous applications.

Numerous other embodiments of the invention will be apparent to persons skilled in the art without departing from the spirit and scope of the invention as defined in the appended claims.

The invention claimed is:

1. A method for adjusting interconnect power levels comprising:
   providing a voltage regulating device in communication with a voltage supply port of a driver of a high-speed differential serial link, the voltage regulating device for providing a regulated supply voltage to the driver;
   receiving at a control port of the voltage regulating device a control signal indicative of a predetermined regulated voltage for provision to the driver for a pre-selected type of data transmission to a receiver via the high-speed differential serial link, the pre-selected type of data transmission having a corresponding interconnect power level;
   using the voltage regulating device providing the regulated supply voltage to the driver by selecting one of a plurality of predetermined reference voltages corresponding to the pre-selected type of data transmission and providing the selected predetermined reference voltage to the driver;
   using the driver transmitting a data signal according to the pre-selected type of data transmission to the receiver;
   providing a switch control signal to the receiver, the switch control signal being indicative of a low-speed data transmission; and,
   switching the receiver into a reflective wave transmission mode in which only dynamic power is consumed while static power consumption is reduced to zero.

2. The method for adjusting interconnect power levels as defined in claim 1 comprising:
   receiving at the control port of the voltage regulating device a control signal indicative of a predetermined second regulated voltage for provision to the driver for a pre-selected second type of data transmission to a receiver via the high-speed differential serial link, the pre-selected second type of data transmission having a corresponding second interconnect power level;
   using the voltage regulating device providing the second regulated supply voltage to the driver; and,
   using the driver transmitting a second data signal according to the pre-selected second type of data transmission to the receiver.

3. The method for adjusting interconnect power levels as defined in claim 1 wherein the regulated supply voltage is such that a sufficient signal to noise ratio is achieved at a substantially minimum interconnect power level for the pre-selected type of data transmission.

4. The method for adjusting interconnect power levels as defined in claim 1 comprising:
   adjusting the regulated supply voltage during transmission of a data signal in dependence upon a feedback control signal provided by the receiver, the feedback control signal being indicative of a quality of the transmitted data signal.

5. The method for adjusting interconnect power levels as defined in claim 4 wherein the data signal is a test signal.

6. A system for adjusting interconnect power levels comprising:
   a driver having a digital input port for receiving a digital data signal and differential output ports for being connected to a differential transmission line of a high-speed differential serial link, the driver for converting the digital data signal into a differential signal for transmission via the differential transmission line to a receiver;
   a voltage regulating device connected to a voltage supply port of the driver, the voltage regulating device having a control port for receiving a control signal, the voltage regulating device for providing a regulated supply voltage to the driver in dependence upon the control signal by selecting one of a plurality of predetermined reference voltages corresponding to a pre-selected type of data transmission and providing the selected predetermined reference voltage to the driver; and,
   control circuitry in communication with the control port of the voltage regulating device, the control circuitry for generating the control signal in dependence upon the pre-selected type of data transmission having a corresponding interconnect power level, the control signal being indicative of the regulated supply voltage, the regulated supply voltage being such that the differential signal has the corresponding interconnect power level, wherein the control circuitry comprises a control communication link for being connected to the receiver, the control communication link for providing a switch control signal to the receiver, the switch control signal being indicative of a reflective wave transmission mode in which only dynamic power is consumed while static power consumption is reduced to zero.

7. The system for adjusting interconnect power levels as defined in claim 6 wherein the control circuitry comprises a control communication link for being connected to the receiver, the control communication link for receiving a feedback control signal from the receiver.

8. The system for adjusting interconnect power levels as defined in claim 6 wherein the driver is a voltage mode driver.

9. The system for adjusting interconnect power levels as defined in claim 8 wherein the driver is a Scalable Low Voltage Signaling (SLVS) driver.

10. The system for adjusting interconnect power levels as defined in claim 6 wherein the voltage regulating device is a linear voltage regulator.

11. The system for adjusting interconnect power levels as defined in claim 10 wherein the linear voltage regulator is a n-channel MOSFET (NMOS) follower voltage regulator.

12. The system for adjusting interconnect power levels as defined in claim 6 wherein the voltage regulating device is a switcher.

13. The system for adjusting interconnect power levels as defined in claim 6 wherein driver and the voltage regulating device are integrated on a same chip.

14. The system for adjusting interconnect power levels as defined in claim 6 comprising a feedback port in communication with the control circuitry for receiving a feedback signal, the feedback signal for adjusting the regulated supply voltage in dependence thereupon.

15. A non-transitory storage medium having data stored therein, the data for when executed resulting in an integrated circuit design of a system for adjusting interconnect power levels, the system comprising:

a driver having a digital input port for receiving a digital data signal and differential output ports for being connected to a differential transmission line of a high-speed differential serial link, the driver for converting the digital data signal into a differential signal for transmission via the differential transmission line to a receiver;

a voltage regulating device connected to a voltage supply port of the driver, the voltage regulating device having a control port for receiving a control signal, the voltage regulating device for providing a regulated supply voltage to the driver in dependence upon the control signal by selecting one of a plurality of predetermined reference voltages corresponding to a pre-selected type of data transmission and providing the selected predetermined reference voltage to the driver; and, control circuitry in communication with the control port of the voltage regulating device, the control circuitry for generating the control signal in dependence upon the pre-selected type of data transmission having a corresponding interconnect power level, the control signal being indicative of the regulated supply voltage, the regulated supply voltage being such that the differential signal has the corresponding interconnect power level, wherein the control circuitry comprises a control communication link for being connected to the receiver, the control communication link for providing a switch control signal to the receiver, the switch control signal being indicative of a reflective wave transmission mode in which only dynamic power is consumed while static power consumption is reduced to zero.

* * * * *